(12) United States Patent
Ouchi et al.

(10) Patent No.: US 9,368,828 B2
(45) Date of Patent: Jun. 14, 2016

(54) ALL-SOLID BATTERY AND MANUFACTURING METHOD THEREFOR

(71) Applicant: MURATA MANUFACTURING CO., LTD., Nagaokakyo-Shi, Kyoto Fu (JP)

(72) Inventors: Masutaka Ouchi, Nagaokakyo (JP); Makoto Yoshioka, Nagaokakyo (JP); Takeshi Hayashi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/150,304

(22) Filed: Jan. 8, 2014

(65) Prior Publication Data

US 2014/0120409 A1    May 1, 2014

Related U.S. Application Data

(63) Continuation of application No. PCT/JP2012/066952, filed on Jul. 3, 2012.

(30) Foreign Application Priority Data

Jul. 8, 2011   (JP) .................................. 2011-151748

(51) Int. Cl.
*H01M 4/58*   (2010.01)
*H01M 10/04*   (2006.01)
(Continued)

(52) U.S. Cl.
CPC ........ *H01M 10/0436* (2013.01); *H01M 4/0471* (2013.01); *H01M 4/139* (2013.01); *H01M 4/5825* (2013.01); *H01M 10/052* (2013.01); *H01M 10/0562* (2013.01); *H01M 10/0585* (2013.01); *H01M 4/1391* (2013.01); *H01M 4/1397* (2013.01); *H01M 2300/002* (2013.01);
(Continued)

(58) Field of Classification Search
CPC ............ H01M 4/5825; H01M 10/052; H01M 10/0562; H01M 10/0585
USPC ......................................... 429/482, 535, 162
See application file for complete search history.

(56) References Cited

U.S. PATENT DOCUMENTS 8,221,916 B2   7/2012   Inda
2009/0123847 A1*   5/2009   Okada et al. .................. 429/319
(Continued)

FOREIGN PATENT DOCUMENTS

CN   101276941 A   10/2008
CN   102027626 A   4/2011
(Continued)

OTHER PUBLICATIONS

PCT/JP2013/066952 Written Opinion dated Sep. 28, 2012.
(Continued)

*Primary Examiner* — Mark F Huff
*Assistant Examiner* — Monique Wills
(74) *Attorney, Agent, or Firm* — Arent Fox LLP

(57) ABSTRACT

A method for manufacturing an all-solid battery that includes: preparing a first green sheet as a green sheet for at least any one of a positive electrode layer and a negative electrode layer; preparing a second green sheet as a green sheet for a solid electrolyte layer; forming a stacked body by stacking the first green sheet and the second green sheet; and firing the stacked body while a pressure of 0.01 kg/cm² or more and 100 kg/cm² or less is applied in the stacking direction of the stacked body.

11 Claims, 1 Drawing Sheet

(51) Int. Cl.
*H01M 10/052* (2010.01)
*H01M 10/0562* (2010.01)
*H01M 10/0585* (2010.01)
*H01M 4/04* (2006.01)
*H01M 4/139* (2010.01)
*H01M 4/1391* (2010.01)
*H01M 4/1397* (2010.01)

(52) U.S. Cl.
CPC ................ *Y02E 60/122* (2013.01); *Y02P 70/54* (2015.11); *Y10T 29/49108* (2015.01)

(56) References Cited

U.S. PATENT DOCUMENTS

2009/0246636 A1* 10/2009 Chiang et al. ............ 429/231.95
2011/0081580 A1 4/2011 Stadler et al.
2013/0344415 A1* 12/2013 Mohanram ................... 429/482

FOREIGN PATENT DOCUMENTS

| | | |
|---|---|---|
| JP | 2007-294429 A | 11/2007 |
| JP | 2009-206087 A | 9/2009 |
| JP | 2009-224318 A | 10/2009 |
| JP | 2010-010110 A | 1/2010 |
| JP | 2011-096630 A | 5/2011 |

OTHER PUBLICATIONS

PCT/JP2013/066952 ISR dated Sep. 28, 2012.

* cited by examiner

ALL-SOLID BATTERY AND MANUFACTURING METHOD THEREFOR

CROSS REFERENCE TO RELATED APPLICATIONS

The present application is a continuation of International application No. PCT/JP2012/066952, filed Jul. 3, 2012, which claims priority to Japanese Patent Application No. 2011-151748, filed Jul. 8, 2011, the entire contents of each of which are incorporated herein by reference.

FIELD OF THE INVENTION

The present invention relates to an all-solid battery and a method for manufacturing the all-solid battery.

BACKGROUND OF THE INVENTION

In recent years, the demand has been substantially expanded for batteries as power sources for portable electronic devices such as cellular phones and portable personal computers. In the batteries for use in such applications, electrolytes (electrolytic solutions) such as organic solvents have been conventionally used as media for moving ions.

However, the batteries configured above are at risk of causing the electrolytic solutions to leak out. In addition, the organic solvents or the like for use in the electrolytic solutions are flammable materials. For this reason, there has been a need to further increase the safety of the batteries.

Therefore, as one of countermeasures for increasing the safety of the batteries, it has been proposed that solid electrolytes are used as the electrolytes, in place of electrolytic solutions. Furthermore, the development of all-solid batteries which use solid electrolytes as the electrolytes and have other constituent elements also composed of solids has been advanced.

For example, Japanese Patent Application Laid-Open No. 2007-294429 (hereinafter, referred to as Patent Document 1) proposes a method for producing a lithium-ion conducting solid electrolyte by firing a compact while applying pressure. Specifically, Patent Document 1 discloses that the firing was carried out while applying a pressure up to 180 MPa on the compact.

For example, Japanese Patent Application Laid-Open No. 2010-10110 (hereinafter, referred to as Patent Document 2) proposes a method for producing a solid electrolyte by firing a compact while the pressure acting from a setter to the compact is set to 500 kg/m$^2$ or less.

For example, Japanese Patent Application Laid-Open No. 2009-224318 (hereinafter, referred to as Patent Document 3) proposes a method for producing an all-solid battery by heating for firing a mixture of an electrode active material and a solid electrolyte while pressure is applied thereto. Specifically, Patent Document 3 discloses carrying out a heat treatment with a pressure of 500 kg/cm$^2$ applied, thereby baking electrodes on both sides of the solid electrolyte base.

Patent Document 1: Japanese Patent Application Laid-Open No. 2007-294429
Patent Document 2: Japanese Patent Application Laid-Open No. 2010-10110
Patent Document 3: Japanese Patent Application Laid-Open No. 2009-224318

SUMMARY OF THE INVENTION

However, Patent Documents 1 and 2 disclose the methods for producing solid electrolytes, and fail to disclose any method for producing by firing a solid battery including a solid electrolyte and a positive electrode or a negative electrode.

Although Patent Document 1 discloses firing a compact while applying pressure to the compact, the pressure applied to the compact has a high value of 180 MPa (about 1800 kg/cm$^2$). When the compact is subjected to firing while being applied with such a high pressure, a production facility is required which is extremely extensive and expensive.

Although Patent Document 3 discloses the method for manufacturing an all-solid battery by firing a mixture of an active material and a solid electrolyte while applying pressure thereto, the pressure applied is a high pressure of 500 kg/cm$^2$. This case has the problem mentioned above.

The inventors have found, as a result of studying various methods for manufacturing all-solid batteries, that in the case of manufacturing by firing a solid battery including a solid electrolyte layer and a positive electrode layer or a negative electrode layer, the adjustment of the pressure applied to a compact can reduce the internal resistance of the battery, and achieve a battery which has a high energy density. The present invention has been achieved on the basis of the finding mentioned above.

Therefore, an object of the present invention is to provide a method for manufacturing an all-solid battery which is low in internal resistance and high in energy density, and an all-solid battery manufactured by the method.

As a result of various studies made by the inventors in order to solve the problem mentioned above, it has been found that the internal resistance of an all-solid battery can be reduced by limiting the pressure applied for firing a stacked body within a predetermined range. On the basis of this finding of the inventors, the present invention has the following features.

A method for manufacturing an all-solid battery in accordance with the present invention includes the following steps.

(A) Green sheet preparation step of preparing a first green sheet as a green sheet for at least any one of a positive electrode layer and a negative electrode layer, and a second green sheet as a green sheet for a solid electrolyte layer.

(B) Stacked body formation step of forming a stacked body by stacking the first green sheet and the second green sheet.

(C) Firing step of firing the stacked body.

(D) The firing step includes firing the stacked body while a pressure of 0.01 kg/cm$^2$ or more and 100 kg/cm$^2$ or less is applied in the stacking direction of the stacked body.

In the firing step, the stacked body is preferably subjected to firing while a pressure of 0.1 kg/cm$^2$ or more and 50 kg/cm$^2$ or less is applied in the stacking direction of the stacked body.

In the firing step, the stacked body is preferably subjected to firing while a pressure of 1 kg/cm$^2$ or more and 10 kg/cm$^2$ or less is applied in the stacking direction of the stacked body.

In the stacked body formation step, green sheets for the positive electrode layer, solid electrolyte layer, and negative electrode layer are preferably stacked to form a stacked body which has an electrical cell structure.

In the method for manufacturing an all-solid battery according to the present invention, at least one material for the positive electrode layer, solid electrolyte layer, or negative electrode layer preferably contains a solid electrolyte composed of a lithium-containing phosphate compound which has a NASICON-type structure.

In the method for manufacturing an all-solid battery according to the present invention, at least one material for the positive electrode layer or negative electrode layer preferably contains an electrode active material composed of a lithium-containing phosphate compound.

An all-solid battery in accordance with the present invention is manufactured by the manufacturing method including the features mentioned above.

The method for manufacturing an all-solid battery according to the present invention can reduce the internal resistance of the all-solid battery and increase the energy density thereof by limiting the pressure applied for firing the stacked body within a predetermined range.

DETAILED DESCRIPTION OF THE INVENTION

Figure 1:
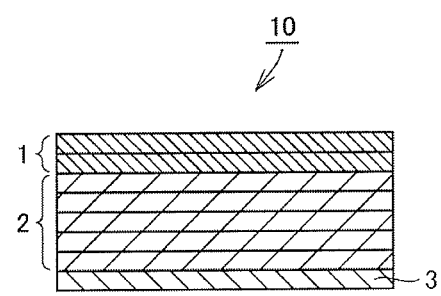
FIG. 1 is a cross-sectional view schematically illustrating a cross-section structure of an all-solid battery as one embodiment through the application of a manufacturing method according to the present invention.

As shown in FIG. 1, a stacked body 10 of an all-solid battery as one embodiment through the application of a manufacturing method according to the present invention is composed of an electrical cell including a positive electrode layer 1, a solid electrolyte layer 2, and a negative electrode layer 3. The positive electrode layer 1 is placed on one surface of the solid electrolyte layer 2, whereas the negative electrode layer 3 is placed on the other surface on the side opposite to the one surface of the solid electrolyte layer 2. In other words, the positive electrode layer 1 and the negative electrode layer 3 are provided in positions opposed to each other with the solid electrolyte layer 2 interposed therebetween.

It is to be noted that each of the positive electrode layer 1 and the negative electrode layer 3 contains a solid electrolyte and an electrode active material, whereas the solid electrolyte layer 2 contains a solid electrolyte. Each of the positive electrode layer 1 and the negative electrode layer 3 may contain a carbon material, a metal material, etc. as an electron conducting material.

In order to manufacture the stacked body 10 of the all-solid battery configured as described above, according to the present invention, a first green sheet as a green sheet for at least any one of the positive electrode layer 1 and negative electrode layer 3, and a second green sheet as a green sheet for the solid electrolyte layer 2 are first prepared (green sheet preparation step). Thereafter, the first green sheet and the second green sheet are stacked to form the stacked body 10 (stacked body formation step). Then, the stacked body 10 is subjected to firing (firing step). In the firing step, the stacked body 10 is subjected to firing while a pressure of 0.01 kg/cm$^2$ or more and 100 kg/cm$^2$ or less is applied in the stacking direction of the stacked body 10.

Although the details are not known, the use of the manufacturing method described above according to the present invention is considered to be able to achieve the following advantageous effects. When the stacked body 10 including a stacked structure of the green sheet for at least any one of the positive electrode layer 1 and negative electrode layer 3 and the green sheet for the solid electrolyte layer 2 is subjected to firing while a pressure within the range of 0.01 kg/cm$^2$ is applied at least in the stacking direction of the stacked body 10, the positive electrode layer 1 or negative electrode layer 3 and the solid electrolyte layer 2 are considered to be able to be closely joined by sintering to reduce the resistance against ion movements at the joint interface between the positive electrode layer 1 or negative electrode layer 3 and the solid electrolyte layer 2, and reduce the internal resistance of the all-solid battery. Furthermore, an all-solid battery which has respective layers densely sintered, and has a high energy density is considered to be able to be achieved.

When a pressure lower than 0.01 kg/cm$^2$ is applied to the stacked body 10, it is estimated that there is a possibility that the energy density of the all-solid battery will be decreased because the resistance against ion movements at the joint interface is not sufficiently reduced, and because the porosity is increased after the respective layers are sintered. Furthermore, because the firing shrinkage percentage varies depending on the porosity and thickness of each layer constituting the stacked body 10, the particle sizes of the particles included in each layer etc, it is estimated that there is a possibility that warpage will be caused, in particular, near end surfaces of the stacked body 10.

On the other hand, when a pressure higher than 100 kg/cm$^2$ is applied to the stacked body 10, it is estimated that there is a possibility that the respective layers are densely sintered to excessively decrease the porosity of the positive electrode layer 1 or negative electrode layer 3, thus making it impossible to absorb the volume change of the electrode active material by charge and discharge, decreasing the capacity of the all-solid battery, and decreasing the energy density. Furthermore, the high pressure stretches the stacked body 10 in a planar direction (in a direction perpendicular to the stacking direction) during the firing. In this case, because the degree of stretching varies depending on the porosity and thickness of each layer constituting the stacked body 10, the particle sizes of the particles included in each layer etc., it is estimated that there is a possibility that the stacked structure will be disordered, in particular, near end surfaces of the stacked body 10, the internal resistance of the all-solid battery will be increased, or internal short-circuit of the all-solid battery will be caused near the end surfaces. Further, in order to apply high pressure to the stacked body 10, a production facility is required which is extremely extensive and expensive.

The pressure applied is not particularly limited as long as the pressure falls within the range of 0.1 to 100 kg/cm$^2$, but can be appropriately determined depending on the materials constituting the stacked body 10, the number of layers stacked, etc. In order to achieve an all-solid battery which is high in energy density and low in internal resistance, the pressure preferably falls within the range of 0.1 to 50 kg/cm$^2$, and further preferably 1 to 10 kg/cm$^2$.

While the method for forming the stacked body 10 in the stacked body formation step is not particularly limited, the stacked body 10 can be formed by sequentially stacking the green sheets, and applying pressure to the stacked green sheets, or the stacked body 10 for lamination. While the pressure applied is not particularly limited, the stacked body 10 which is dense and less likely to be peeled can be formed by applying a pressure of 500 kg/cm$^2$ or more and 5000 kg/cm$^2$ or less to the first green sheet and the second green sheet, or the stacked body 10 in the stacked body formation step. In addition, in the stacked body formation step, the pressure is preferably applied to the first green sheet and the second green sheet, or the stacked body 10, while heat is applied, for example, while the temperature is kept at 20° C. or higher and 100° C. or lower.

In the stacked body formation step, green sheets for the positive electrode layer 1, the solid electrolyte layer 2, and the negative electrode layer 3 are preferably stacked to form the stacked body 10 which has an electrical cell structure. Furthermore, in the stacked body formation step, a stacked body may be formed by stacking more than one stacked body 10 which has the electrical cell structure while a green sheet for a current collector is interposed therebetween. In this case, more than one stacked body 10 which has the electrical cell structure may be stacked electrically in series or in parallel. If necessary, green sheets may be stacked in a predetermined pattern.

While the method for forming the green sheets is not particularly limited, a die coater, a comma coater, screen printing, etc. can be used. While the method for stacking the green sheets is not particularly limited, hot isostatic pressing (HIP), cold isostatic pressing (CIP), water isostatic pressing (WIP), etc. can be used to stack the green sheets.

Slurry for forming the green sheets can be prepared by wet mixing an organic vehicle with a polymer material dissolved in a solvent, with a positive electrode active material, a negative electrode active material, a solid electrolyte, or a current collector material. In the wet mixing, media can be used, and specifically, a ball mill method, a visco mill method, etc. can be used. On the other hand, wet mixing methods may be used which use no media, and a sand mill method, a high-pressure homogenizer method, a kneader dispersion method, etc. can be used.

The slurry may contain a plasticizer. While the type of the plasticizer is not particularly limited, phthalates and the like may be used such as dioctyl phthalate and diisononyl phthalate.

While the atmosphere is not particularly limited in the firing step, the firing step is preferably carried out under the condition that the transition metal contained in the electrode active material undergoes no change in valence.

It is to be noted that while the type of the electrode active material is not limited which is contained in the positive electrode layer 1 or negative electrode layer 3 of the stacked body 10 of the all-solid battery through the application of the manufacturing method according to the present invention, lithium-containing phosphate compounds which have a NASICON-type structure such as $Li_3V_2(PO_4)_3$, lithium-containing phosphate compounds which have an olivine-type structure such as $LiFePO_4$ and $LiMnPO_4$, layered compounds such as $LiCoO_2$ and $LiCo_{1/3}Ni_{1/3}Mn_{1/3}O_2$, and lithium-containing compounds which have a spinel-type structure such as $LiMn_2O_4$ and $LiNi_{0.5}Mn_{1.5}O_4$ can be used as the positive electrode active material.

Compounds which have a composition represented by MOx (M is at least one or more elements selected from the group consisting of Ti, Si, Sn, Cr, Fe, and Mo, and x is a numerical value in the range of $0.9 \leq x \leq 2.0$) can be used as the negative electrode active material. For example, a mixture may be used which is obtained by mixing two or more active materials containing different elements M, which have compositions represented by MOx, such as $TiO_2$ and $SiO_2$. In addition, graphite-lithium compounds, lithium alloys such as Li—Al, oxides such as $Li_3V_2(PO_4)_3$, $Li_3Fe_2(PO_4)_3$, and $Li_4Ti_5O_{12}$, etc. can be used as the negative electrode active material.

In addition, while the type of the solid electrolyte is not limited which is contained in the positive electrode layer 1, negative layer 3 or solid electrolyte layer 2 of the stacked body 10 of the all-solid battery through the application of the manufacturing method according to the present invention, lithium-containing phosphate compounds which have a NASICON-type structure can be used as the solid electrolyte. The lithium-containing phosphate compounds which have a NASICON-type structure are represented by the chemical formula $Li_xM_y(PO_4)_3$ (in the chemical formula, x and y are respectively numerical values in the ranges of $1 \leq x \leq 2$ and $1 \leq y \leq 2$, and M represents one or more elements selected from the group consisting of Ti, Ge, Al, Ga, and Zr). In this case, P may be partially substituted with B, Si, or the like in the above chemical formula. For example, a mixture may be used which is obtained by mixing two or more solid electrolytes which have different compositions, from lithium-containing phosphate compounds which have a NASICON-type structure, such as $Li_{1.5}Al_{0.5}Ge_{1.5}(PO_4)_3$ and $Li_{1.2}Al_{0.2}Ti_{1.8}(PO_4)_3$.

In addition, compounds including a crystalline phase of a lithium-containing phosphate compound which has a NASICON-type structure, or glass from which crystalline phase of a lithium-containing phosphate compound which has a NASICON-type structure is deposited through a heat treatment may be used as the lithium-containing phosphate compounds which have a NASICON-type structure, for use in the solid electrolyte.

Further, it is possible to use, as the material for use in the solid electrolyte, materials which have ion conductivity and negligible small electron conductivity, besides the lithium-containing phosphate compounds which have a NASICON-type structure. Such materials can include, for example, lithium halide, lithium nitride, lithium oxoate, and derivatives thereof. In addition, the materials can include Li—P—O compounds such as lithium phosphate ($Li_3PO_4$), LIPON ($LiPO_{4-x}N_x$) with nitrogen introduced into lithium phosphate, Li—Si—O compounds such as $Li_4SiO_4$, Li—P—Si—O compounds, Li—V—Si—O compounds, compounds which have perovskite-type structures such as $La_{0.51}Li_{0.35}TiO_{2.94}$, $La_{0.55}Li_{0.35}TiO_3$, and $Li_{3x}La_{2/3-x}TiO_3$, and compounds which have a garnet-type structure containing Li, La, and Zr.

At least one material for the positive electrode layer 1, solid electrolyte layer 2, or negative electrode layer 3 of the stacked body 10 of the all-solid battery through the application of the manufacturing method according to the present invention preferably contains a solid electrolyte composed of a lithium-containing phosphate compound which has a NASICON-type structure. In this case, high ion conductivity can be achieved which is essential for battery operation of the all-solid battery. In addition, the use of, as the solid electrolyte, glass or glass ceramic which has the composition of a lithium-containing phosphate compound of NASICON-type structure can easily achieve a denser sintered body through the viscous flow of the glass phase in the firing step, and it is thus particularly preferable to prepare starting raw materials for the solid electrolyte in the form of glass or glass ceramic.

In addition, at least one material for the positive electrode layer 1 or negative electrode layer 3 of the stacked body 10 of the all-solid battery through the application of the manufacturing method according to the present invention preferably contains an electrode active material composed of a lithium-containing phosphate compound. In this case, the phase change of the electrode active material or the reaction of the electrode active material with the solid electrolyte in the firing step can be easily suppressed with high temperature stability of the phosphate skeleton, and the capacity of the all-solid battery can be thus increased. In addition, when the electrode active material composed of a lithium-containing phosphate compound is used in combination with the solid electrolyte composed of a lithium-containing phosphate compound of NASICON-type structure, the reaction between the electrode active material and the solid electrolyte can be suppressed in the firing step, and favorable contact between the both can be achieved. Thus, it is particularly preferable to use the materials for the electrode active material and solid electrolyte in combination as described above.

Next, examples of the present invention will be described specifically. It is to be noted that the following examples will be given by way of example, and the present invention is not to be considered limited to the following examples.

EXAMPLES

Examples 1 to 8 of all-solid batteries prepared in accordance with the manufacturing method according to the present invention and Comparative Examples 1 and 2 will be described below.

First, in order to prepare all-solid batteries according to Examples 1 to 8 and Comparative Examples 1 and 2, the following materials were prepared as starting raw materials for the solid electrolyte layer, positive electrode layer, and negative electrode layer.

Prepared were a glass powder with a composition of $Li_{1.5}Al_{0.5}Ge_{1.5}(PO_4)_3$ as a solid electrolyte material, a powder including a crystalline phase of NASICON-type structure with a composition of $Li_3V_2(PO_4)_3$ as a positive electrode active material, a titanium dioxide powder of anatase-type crystal structure as a negative electrode active material, and a carbon powder as an electron-conducting material.

The materials mentioned above were used to prepare each slurry by the following method.

(Preparation of Slurry)

The following main material, butyral resin, and alcohol were weighed in proportions by mass at 100:15:140. Then, the butyral resin was dissolved in alcohol, and then enclosed in a container along with the main material and media, and after rotating the container, the media were taken out of the container to prepare each slurry.

A solid electrolyte material for solid electrolyte slurry, a powder obtained by mixing a positive electrode active material, an electron-conducting material, and a solid electrolyte material in proportions by mass at 45:15:40 for positive electrode slurry, or a powder obtained by mixing a negative electrode active material, an electron-conducting material, and a solid electrolyte material in proportions by mass at 45:15:40 for negative electrode slurry was used as the main material.

Each slurry obtained was used to prepare each green sheet by the following method.

(Green Sheet Preparation Step)

Each slurry was applied onto a polyethylene terephthalate (PET) film by use of a doctor blade method, dried on a hot plate heated to a temperature of 40° C., formed into the shape of a sheet of 10 μm in thickness, and cut into a size of 25 mm×25 mm to prepare a sheet.

The respective green sheets obtained were used to form a stacked body according to each of Examples 1 to 8 and Comparative Examples 1 and 2 by the following method.

(Stacked Body Formation Step)

First, the stacked body 10 was formed through sequential thermocompression bonding by sandwiching the green sheets between two stainless-steel flat plates, every time each of the green sheets peeled from the PET film was stacked. The thermocompression bonding was carried out by heating the stainless-steel flat plates to a temperature of 60° C., and applying a pressure of 1000 kg/cm². Next, the stacked body 10 was enclosed in a film container made of polyethylene in vacuum, and pressure was applied to the film container by isostatic pressing at a hydraulic pressure of 180 MPa. In this way, the stacked body 10 was prepared.

It is to be noted that the stacked body 10 has an electrical cell structure as shown in FIG. 1, which is composed of the positive electrode layer 1 of two positive electrode green sheets, the solid electrolyte layer 2 of five solid electrolyte green sheets, and the negative electrode layer 3 of one negative electrode sheet.

The stacked body obtained according to each of Examples 1 to 8 and Comparative Examples 1 and 2 was subjected to firing by the following method.

Firing Step

Comparative Example 1

Figure 2:
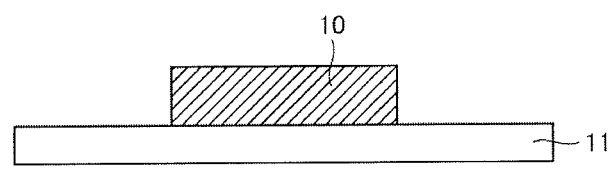
FIG. 2 is a cross-sectional view schematically illustrating one mode of a firing step as a comparative example according to the present invention.

The stacked body 10 was cut into a size of 10 mm×10 mm, and subjected to firing while still standing on one porous setter 11 as shown in FIG. 2.

Examples 1 to 8, Comparative Example 2

Figure 3:
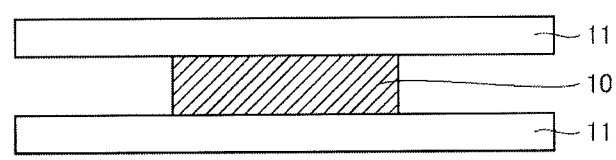
FIG. 3 is a cross-sectional view schematically illustrating one mode of a firing step as an example according to the present invention.

The stacked body 10 was cut into a size of 10 mm×10 mm, sandwiched between two porous setters 11 as shown in FIG. 3, and subjected to firing with the pressure shown in Table 1 below applied to the setters 11.

It is to be noted that the stacked body according to each of Examples 1 to 8 and Comparative Examples 1 and 2 was subjected to firing at a temperature of 700° C. in a nitrogen gas atmosphere after the butyral resin was removed by firing at a temperature of 500° C. in a nitrogen gas atmosphere containing 1 volume % of oxygen.

The stacked body 10 of the all-solid battery prepared in the way described above was evaluated in the following way.

(Evaluation)

A positive electrode terminal and a negative electrode terminal were formed in such a way that a silver paste was applied onto both surfaces of the fired stacked body 10, and dried while copper lead terminals were buried into the silver paste.

The stacked body 10 of the all-solid battery with the positive and negative electrode terminals attached thereto was charged up to a voltage of 3.2 V at a current of 5 μA in an argon gas atmosphere, and kept for 10 hours at the voltage of 3.2 V. Thereafter, the stacked body was discharged down to a voltage of 0 V at a current of 5 μA to measure the discharge capacity.

Thereafter, the stacked body was charged with a quantity of electricity corresponding to 50% of the discharge capacity at a current of 5 μA, and suspended for 1 hour. Then, the battery voltage (battery voltage immediately before discharge) [V] was measured. Subsequently, the battery voltage (battery voltage after discharge for 10 seconds) [V] was measured after discharge for 10 seconds at a current of 20 μA. The internal resistance was calculated from the following formula with the use of the values of the battery voltages measured as described above.

(Internal Resistance [Ω])={(Battery Voltage [V] Immediately Before Discharge)−(Battery Voltage [V] After Discharge for 10 seconds)}/(Time-Averaged Current Value [A] for 10 seconds)

Table 1 shows the evaluation results.

TABLE 1

|  | Pressure [kg/cm²] | Discharge Capacity [μAh] | Internal Resistance [kΩ] |
|---|---|---|---|
| Example 1 | 0.01 | 73 | 3.0 |
| Example 2 | 0.06 | 76 | 3.0 |
| Example 3 | 0.1 | 79 | 2.6 |
| Example 4 | 1 | 85 | 2.6 |
| Example 5 | 5 | 87 | 2.4 |

TABLE 1-continued

| | Pressure [kg/cm²] | Discharge Capacity [μAh] | Internal Resistance [kΩ] |
|---|---|---|---|
| Example 6 | 10 | 89 | 2.6 |
| Example 7 | 50 | 85 | 3.1 |
| Example 8 | 100 | 76 | 3.2 |
| Comparative Example 1 | — | — | — |
| Comparative Example 2 | 200 | 42 | 5.1 |

From Table 1, it is understood that Examples 1 to 8 are high in discharge capacity and low in internal resistance as compared with Comparative Example 2. In particular, it is understood that Examples 4 to 7 are high in discharge capacity, whereas Examples 3 to 6 are low in internal resistance. From the foregoing, it was confirmed that the pressure applied during the firing step may fall within the range of 0.1 to 100 kg/cm², preferably falls within the range of 0.1 to 50 kg/cm², and further preferably 1 to 10 kg/cm².

It is to be noted that in the case of Comparative Example 1, the stacked body was not able to be evaluated as described above due to substantial warpage caused after the firing step, because no pressure was applied to the stacked body in the firing step.

The embodiments and examples disclosed herein are all to be considered by way of example in all respects, but not restrictive. The scope of the present invention is defined by the claims, but not the embodiments or examples described above, and intended to encompass all modifications and variations within the meaning and scope equivalent to the scope of the claims.

The method for manufacturing an all-solid battery according to the present invention can reduce the internal resistance of the all-solid battery and increase the energy density thereof by limiting the pressure applied for firing the stacked body within a predetermined range. Thus, the present invention is useful particularly for the manufacture of all-solid secondary batteries.

DESCRIPTION OF REFERENCE SYMBOLS

1: positive electrode layer, 2: solid electrolyte layer, 3: negative electrode layer, 10: stacked body, 11: setter

The invention claimed is:

1. A method for manufacturing an all-solid battery, the method comprising:
preparing a first green sheet as a green sheet for at least any one of a positive electrode layer and a negative electrode layer;
preparing a second green sheet as a green sheet for a solid electrolyte layer;
forming a stacked body by stacking the first green sheet and the second green sheet; and
firing the stacked body while a pressure of 0.01 kg/cm² or more and 100 kg/cm² or less is applied in a stacking direction of the stacked body.

2. The method for manufacturing an all-solid battery according to claim 1, wherein the stacked body is fired while a pressure of 0.1 kg/cm² or more and 50 kg/cm² or less is applied in the stacking direction of the stacked body.

3. The method for manufacturing an all-solid battery according to claim 1, wherein stacked body is fired while a pressure of 1 kg/cm² or more and 10 kg/cm² or less is applied in the stacking direction of the stacked body.

4. The method for manufacturing an all-solid battery according to claim 1, wherein green sheets for the positive electrode layer, the solid electrolyte layer, and the negative electrode layer are stacked to form a stacked body having an electrical cell structure.

5. The method for manufacturing an all-solid battery according to claim 1, wherein at least one material for the positive electrode layer, the solid electrolyte layer, or the negative electrode layer contains a solid electrolyte comprising a lithium-containing phosphate compound having a NASICON-type structure.

6. The method for manufacturing an all-solid battery according to claim 1, wherein at least one material for the positive electrode layer or the negative electrode layer contains an electrode active material comprising a lithium-containing phosphate compound.

7. The method for manufacturing an all-solid battery according to claim 6, wherein the stacked body is fired in an atmosphere where a transition metal contained in the electrode active material undergoes no change in valence.

8. The method for manufacturing an all-solid battery according to claim 1, wherein the stacked body is formed by sequentially stacking the green sheets, and applying pressure to the stacked green sheets.

9. The method for manufacturing an all-solid battery according to claim 8, wherein the pressure applied when forming the stacked body is 500 kg/cm2 or more and 5000 kg/cm2 or less.

10. The method for manufacturing an all-solid battery according to claim 9, wherein, when the pressure is applied to the stacked body, heat is applied.

11. The method for manufacturing an all-solid battery according to claim 10, wherein a temperature of the heat is 20° C. or higher and 100° C. or lower.

* * * * *